United States Patent

Wasylenko

[15] 3,663,014

[45] May 16, 1972

[54] RETRACTABLE CARD GRIPPER

[72] Inventor: William J. Wasylenko, Philadelphia, Pa.

[73] Assignee: Control Data Corporation, Minneapolis, Minn.

[22] Filed: June 5, 1970

[21] Appl. No.: 43,964

[52] U.S. Cl. .......... 271/82, 271/51

[51] Int. Cl. .......... B65h 29/06

[58] Field of Search .......... 271/82, 51, 53, 71, 80, 79; 346/138; 101/409, 410, 411

[56] References Cited

UNITED STATES PATENTS

| | | | |
|---|---|---|---|
| 1,123,024 | 12/1914 | Sheehan | 271/82 |
| 2,599,442 | 6/1952 | Essex et al. | 271/82 X |

FOREIGN PATENTS OR APPLICATIONS

| | | | |
|---|---|---|---|
| 1,137,040 | 9/1962 | Germany | 101/409 |

*Primary Examiner*—Evon C. Blunk
*Assistant Examiner*—Bruce H. Stoner, Jr.
*Attorney*—Edward L. Schwarz, Paul L. Sjoquist and Joseph A. Genovese

[57] ABSTRACT

An improvement in a card transporting device of the type including a pair of coaxially mounted, continuously rotating discs, each having a number of card gripper assemblies, each cooperating with an assembly on the disc for receiving a card, transporting it to the bottom of a stack of cards and placing it there. Each assembly includes an upper jaw mounted on a member which is pivotably attached to the disc and urged about the pivot in a first direction by a spring, a lower jaw similarly mounted on another member also pivotably attached to the disc and urged about its pivot in the opposite direction so as to normally close the jaws with sufficient force to grasp a card. A cam follower is mounted on the upper jaw member and cooperates with a cam mounted stationary with respect to the disc for rotating that member against the force of its spring and opening the jaws to receive the card. A wiper member is further mounted on the upper jaw member for frictionally engaging and pulling into proper position the bottom card on the stack at the same time or before the grasped card is stripped from the jaws by frictional engagement with the stack bottom. According to the improvement, the lower jaw has a hook on its end so that when a card is being grasped the upper jaw member is in a position such that the wiper frictionally engages and positions the bottom card, but, when no card is being grasped, the upper jaw member is in a position such that the wiper misses the bottom card, thus avoiding unnecessary card wear and stack vibration.

4 Claims, 5 Drawing Figures

INVENTOR

WILLIAM J. WASYLENKO

BY Cushman, Darby & Cushman

ATTORNEYS

INVENTOR
WILLIAM J. WASYLENKO

BY Cushman, Darby & Cushman
ATTORNEYS

INVENTOR
WILLIAM J. WASYLENKO

BY
Cushman, Darby & Cushman
ATTORNEYS

RETRACTABLE CARD GRIPPER

BRIEF DESCRIPTION OF THE PRIOR ART AND SUMMARY OF THE INVENTION

The invention relates to an improvement in a card transporting device for placing cards on the bottom of a stack.

In many devices, which employ punched or other similar cards, it is desirable to transport such cards from some location to the bottom of a stack of such cards. One apparatus which has been used successfully in the past for this purposes includes two coaxially mounted discs which are continuously rotated and which are each provided with a number of gripper assemblies, each paired with a corresponding assembly on the other disc for jointly receiving and holding a card so that it rotates with two discs.

Each of the gripper assemblies includes an upper and a lower jaw, each jaw being mounted on a respective member which is fastened to the periphery of the associated disc. The upper and lower jaws are urged toward each other by springs connecting the respective members to the disc. The member onto which one of the jaws is mounted is pivotable about its point of attachment to the disc and is provided with a cam follower which cooperates with a fixedly mounted cam relative to which the disc moves, so that when the disc has rotated to the point where the card is presented to the jaws the rotating cam follower has encountered the cam and caused the associated member to move its jaw away from the other jaw so as to receive the card. Moving past the cam, the jaws of the two gripper assemblies then close and carry the card to the stack.

As the gripper assemblies rotate each card in turn past the stack, the gripped card frictionally engages the bottom card of the stack and is stripped from the closed jaws. A cork wiper mounted on the assembly at roughly the same time or before frictionally engages the last stripped card and pulls it into exact position on the stack bottom.

However, such devices normally operate continuously even when cards are not being continuously presented for each pair of jaws to grab in turn. Accordingly, with devices now in use, the cork wiper engages the bottom card each time it passes the stack even when no cards are being transported. This results in considerable wear on the bottom card when it is not being replaced and in unnecessary vibrations of the stack.

The invention of this application relates to an improvement in such an apparatus wherein the two jaws are constructed so that when no card is being gripped the cork wiper does not frictionally engage the bottom of the stack as it passes. In the embodiment of this invention, as discussed below, this is accomplished by providing a hook on the lower jaw so that the upper jaw is nested inside the lower jaw when no card is gripped. The cork wiper is mounted on the top of the upper jaw and accordingly misses the bottom card on the stack when the upper jaw is so nested, but frictionally engages the last stripped card to properly position it when the two pairs of gripper assemblies hold a card.

Many other objects and purposes of the invention will become clear from the following detailed description of an embodiment of the invention, as referred to in drawings briefly described below.

DETAILED DESCRIPTION OF THE DRAWINGS

Figure 1:
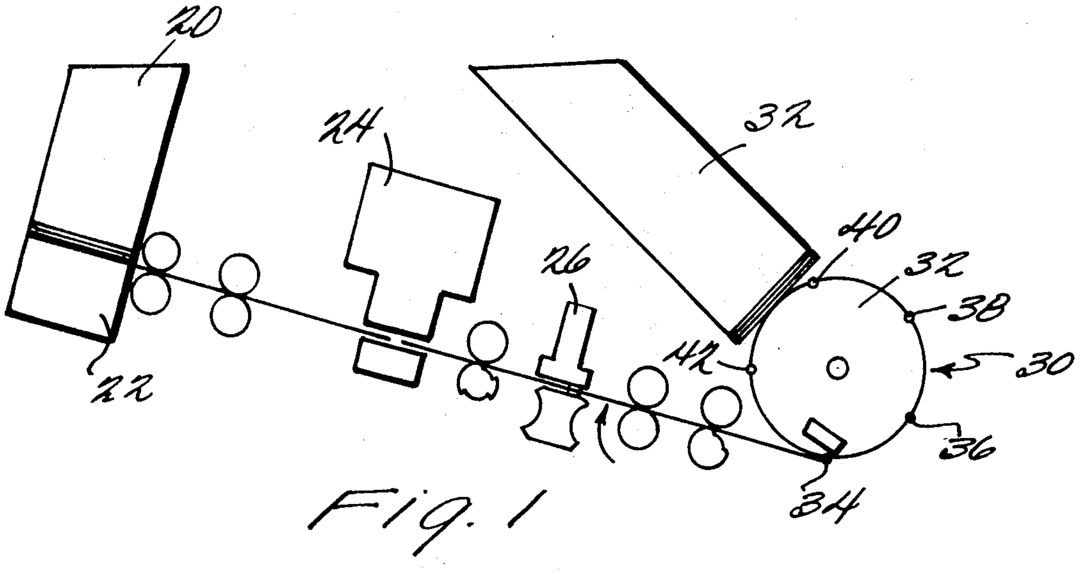
FIG. 1 shows a schematic view of a card punching and transporting system.

Reference is now made to FIG. 1 which shows a schematic view of a card punching system having a number of different machines, including one incorporating the novel improvement of this invention. Unpunched cards from a suitable storage hopper 20 are sequentially removed from a picker 22 and transported to a conventional punch station 24. After punching, the cards each pass in turn through a conventional check station 26 to a transport mechanism 30 which grabs each card as it is presented and conveys it to the bottom of the stack of punched cards in stacker 31 where each is placed in turn.

Figure 5:
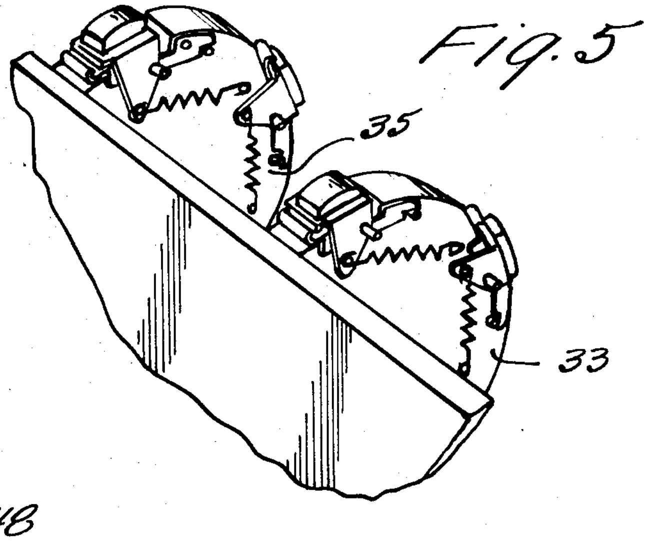
FIG. 5 shows a perspective view of the apparatus of this invention with a number of gripper assemblies mounted on two coaxially mounted, continuously rotating discs.

Transport mechanism 30 includes a pair of coaxially mounted discs of which only disc 32 can be seen in FIG. 1. Two similar discs 33 and 35, each having gripper assemblies mounted on its periphery, can be seen in FIG. 5. The two discs are continuously rotated and each has mounted on its periphery a number of gripper assemblies. Disc 32 has assemblies 34, 36, 38, 40 and 42 and the other disc is similarly provided with a like number of assemblies, each cooperating with an assembly on disc 32 to grasp and carry a punched card.

Figure 2:
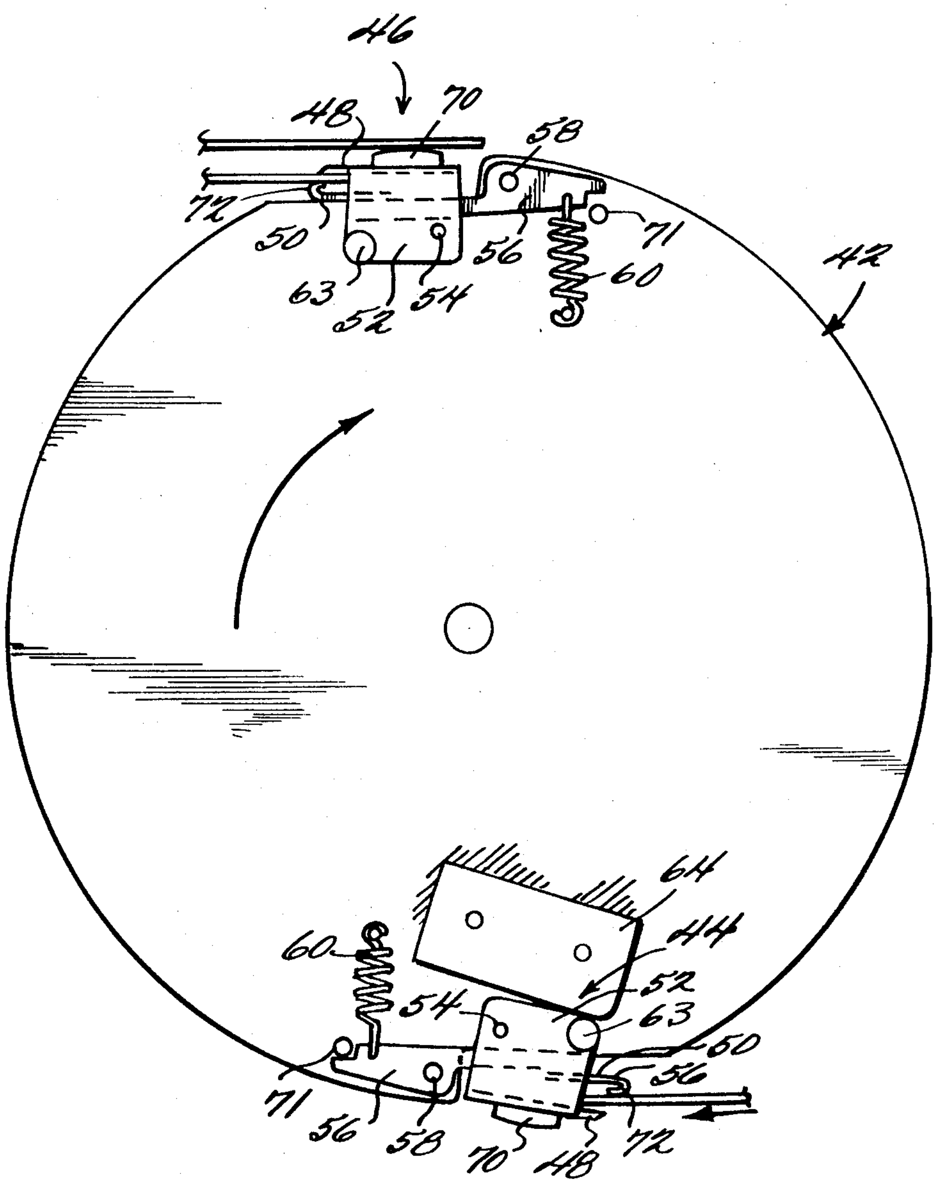
FIG. 2 shows two gripper assemblies on a disc with one assembly in a card receiving position receiving a card, and the other assembly in a card stripping position.

Reference is now made to FIG. 2 which shows a detailed view of a disc 42 which has mounted on its periphery two gripper assemblies 44 and 46. It will, of course, be understood that disc 42 will normally have more assemblies and that it will operate with only one assembly mounted on it. Each assembly is preferably substantially identical to the other assemblies on disc 42, and for convenience the same elements bear the same numerals in the description that follows.

Figure 4:
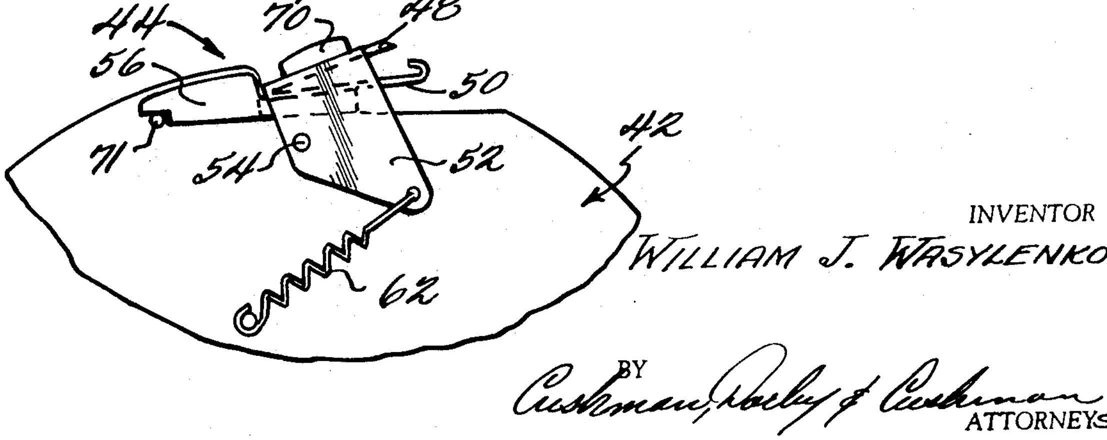
FIG. 4 shows a view of the other side of one of the gripper assemblies of FIGS. 2 and 3.

As mentioned briefly above, each assembly includes an upper jaw 48 and a lower jaw 50 which pin the card between them so that it rotates with disc 42. The surfaces of jaws 48 and 50 may be serrated if desired. Jaw 48 is attached to member 52 which is in turn pivotably mounted on disc 42 by pin 54 which permits free rotation of member 52 about itself. Jaw 50 is similarly attached to member 56 which is also pivotably mounted on disc 42 by a pin 58 which also permits member 56 to rotate freely about itself. Both members 52 and 56 have a U-shaped channel which is occupied by the disc periphery, which can be readily seen from the view of the other side of assembly 44 in FIG. 4.

A spring 60 is connected between member 56 and disc 42 so as to continually urge member 56 and jaw 50 in a clockwise direction. Similarly, a spring 62, which can be seen in FIG. 4, links member 52 to disc 42 to continually urge member 52 and jaw 48 in a counterclockwise direction. Thus, the two springs pull jaws 48 and 50 toward one another with sufficient force for the two jaws to hold a card and rotate it with disc 42. As can be seen by the position of assembly 46 in FIGS. 2 and 3, spring 62 (shown in FIG. 4) is strong enough to cause member 52 to force jaw 50 close to disc 42, thereby extending spring 60 to its maximum when cam follower 63 is disengaged from cam 64.

Member 52 is further provided with a cam follower 63 which extends outward from member 52. When an assembly has rotated to the position at which a card is presented, which is the position of assembly 44 in FIG. 2, cam follower 63 engages fixedly mounted cam 64 with respect to which disc 42 moves. This engagement causes member 52 to rotate in a clockwise direction against the urging of spring 62. A stop 71 limits the clockwise rotation of member 56 with the result that the jaws 48 and 50 open and a card can then be inserted by any appropriate apparatus as shown. Members 52 and 56 rotate about different pivots 54 and 58 respectively so that when member 56 rotates into contact with stop 71, jaw 48 can slip past hook 72, but when member 56 is in its normal position jaw 48 rests on hook 72 as shown. Continued rotation of disc 42 moves cam follower 63 further along the surface of cam 64 so that member 52, under the influence of spring 62 (see FIG. 4), now rotates in a counter clockwise direction until the card is firmly locked between jaws 48 and 50. Counterclockwise rotation of members 52 and 56 continues until jaw 50 is resting on the edge of disk 42. As this rotation occurs, jaw 48 of assembly 44 slips rightwardly with respect to jaw 50 so that, as shown in assembly 46 of FIG. 2, an appreciable portion of jaw 48 overlaps hook 72.

Thus held, the captive card and gripper assembly rotate to the position of assembly 46 adjacent the bottom of a stack of punched cards. A wiper 70, which is preferably of cork but which may be made of any suitable material and may be of any suitable size, is mounted on member 52 so as to frictionally engage the bottom card on the stack, which is of course the card stripped from the last gripper assembly to pass with a card. Wipers such as wiper 70 can be seen best in FIG. 5, which shows a perspective view of the apparatus of this invention with a number of gripper assemblies mounted on two coaxially mounted discs. Wiper 70 thus causes the last stripped card to be precisely positioned on the bottom of the stack.

At about the same time or after wiper 70 has pulled the last-stripped card into position, the card held between jaws 48 and 50 frictionally engages the bottom of the stack and is stripped from the jaws. Normally the card will not be stripped until after the bottom card has been positioned by wiper 70, and will not be exactly positioned below the stack, thus necessitating a positioning of the stripped card by the wiper 70 on the next assembly to pass.

However, as mentioned briefly above, on of the problems with this type of apparatus as it previously existed was that each time an assembly passed the bottom of the stack the wiper on the assembly frictionally engaged the bottom card on the stack regardless of whether that assembly held a card or not. If cards were not being conveyed for some substantial time interval, a not infrequent occurrence, the repeated battering of the bottom card would result in considerable and unnecessary wear of that card, as well as unnecessary vibration of the stack.

In the invention of this application, the two jaws are constructed so that when no card is held between them, the upper jaw is nested in the lower jaw and, accordingly, the wiper is in a position such that it misses the bottom card as it passes the stack. In this embodiment, lower jaw 50 is provided with a hook 72 at its end as shown. If a card has been inserted between the jaws 48 and 50, when they close, as for example, assembly 44 moves past cam 64, the card prevents upper jaw 48 from moving past hook 72 on lower jaw 50. Counterclockwise rotation of members 56 and 52 of assembly 44 about their respective pivots 58 and 54 causes jaw 48 to move rightwardly with respect to jaw 50. Thus, the counterclockwise rotation of member 52 about pin 54 under the influence of spring 62 is halted with the upper jaw 48 resting on hook 72 such that wiper 70 engages the bottom card on the stack when in the position of assembly 46.

Figure 3:
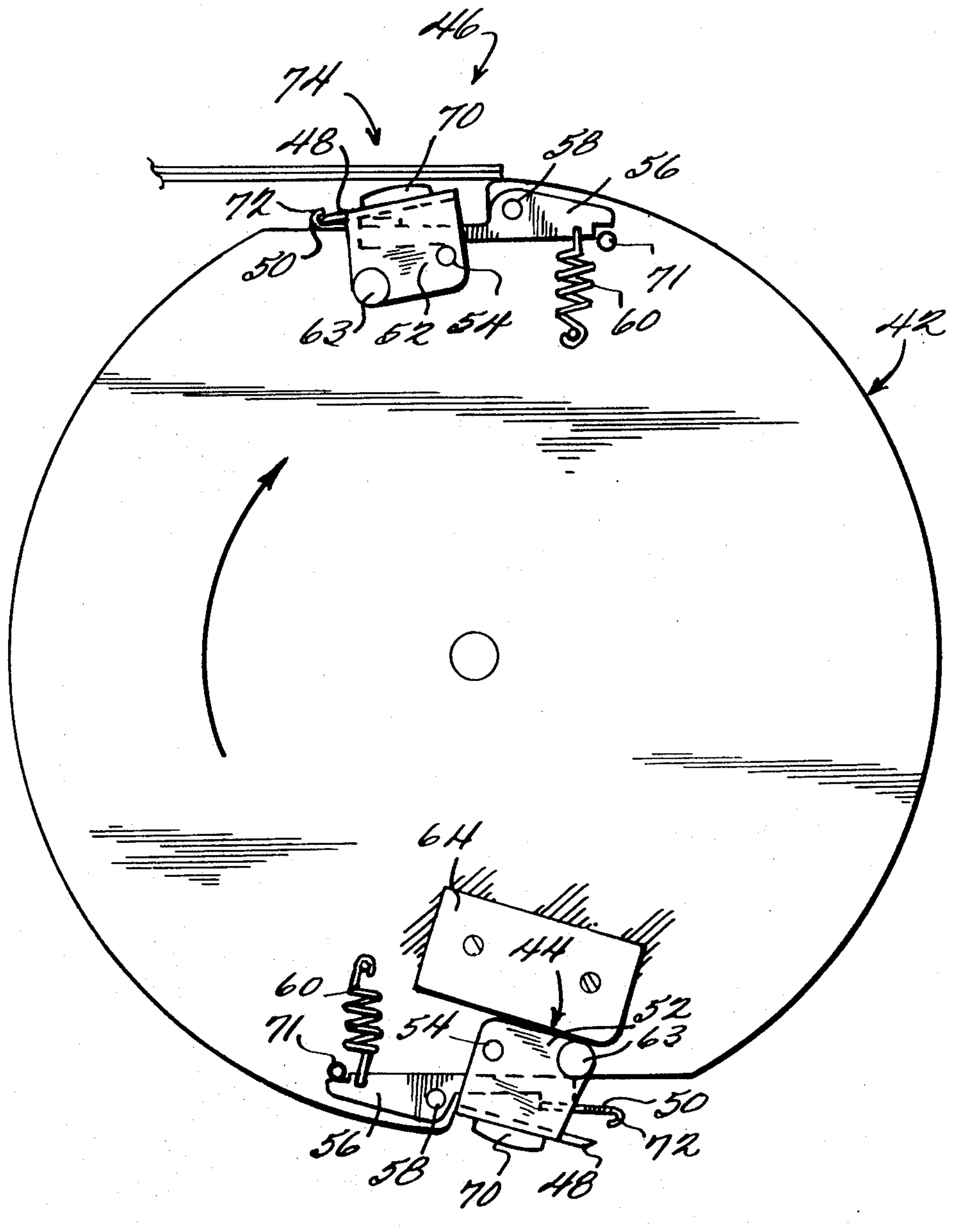
FIG. 3 shows two gripper assemblies on a disc with one assembly in the card receiving position, but not receiving a card and the other assembly in the card stripping position but with no card so that the upper jaw is nested in the lower jaw and the cork wiper does not frictionally engage the bottom card of the stack.

If, however, the two jaws do not receive a card in the position in which assembly 44 is shown, upper jaw 48 moves past hook 72 on lower jaw 50 to the position shown in assembly 74 in FIG. 3. In this position, member 52 has rotated such that wiper 70 now just misses the bottom card on the stack as it passes. Accordingly, unnecessary wear on the bottom card and unnecessary vibration of the stack are avoided.

Many changes and modifications in the above embodiment of the invention can, of course, be made without departing from the scope of the invention. Particularly, the invention is not limited to a continuously rotating disc. For example, the novel gripper assemblies can also be mounted on a reciprocating carriage or a chain driven card transporter. Accordingly, this invention is intended to be limited only by the scope of the appended claims.

What is claimed is:

1. In a card transporting apparatus for receiving a card and transporting it to the bottom of a stack of similar cards having a carrier member adapted to move from a reception to a delivery position, a cam member mounted so as to move with respect to said carrier member and at least a single card gripper assembly comprising an upper jaw, an upper jaw member attached to said upper jaw and pivotably mounted on said carrier member, a first spring connecting said upper jaw member to said carrier member and urging said upper jaw member about its pivot in a first direction, a lower jaw, a lower jaw member attached to said lower jaw and pivotably mounted on said carrier member, a second spring connecting said lower jaw member to said carrier member and urging said lower jaw member about its pivot in a direction opposite to said first direction, stop means for limiting the rotation of said lower jaw in a direction opposite to said first direction, a cam follower member on said upper jaw member for engaging said cam member at said reception position so that said upper jaw member rotates in a direction opposite to said first direction to separate said upper jaw from said lower jaw and receive a card which rotates with said assembly to said delivery position at the bottom of said stack where it frictionally engages said bottom and is stripped from said upper and lower jaws, and a wiper member mounted on said upper jaw member for frictionally engaging the bottom card on said stack and positioning it with regard to said stack, the improvement wherein one of said jaws includes means for causing said upper jaw member to be in a first position as it passes said stack so that said wiper member engages said bottom card when a card is between said jaws and for causing said upper jaw member to be in a second position as it passes said stack so that said wiper member does not engage said bottom card when no card is between said jaws.

2. In an apparatus as in claim 1, the further improvement wherein said causing means in a hook on said lower member.

3. In an apparatus as in claim 2, the further improvement wherein said upper jaw member and said lower jaw member are pivotably mounted at different locations on said carrier member so that said upper jaw moves past said lower jaw when said lower jaw member is rotated against said stop means and said upper jaw rests on said hook when said upper jaw member moves past said reception position.

4. In an apparatus as in claim 1, the further improvement wherein said carrier member is a disc adapted to be rotated.

* * * * *